United States Patent Office.

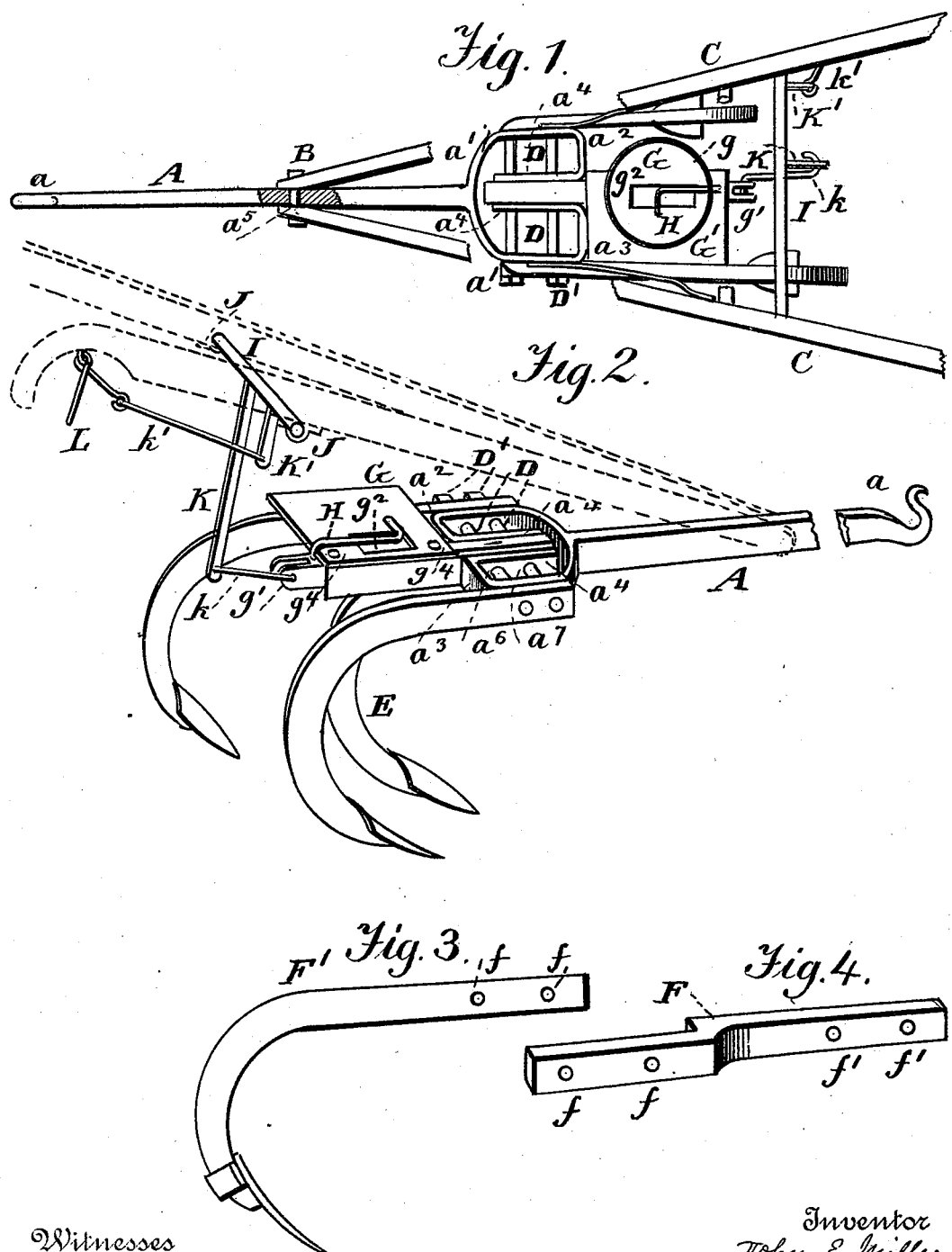

JOHN E. MILLER, OF LINWOOD, NORTH CAROLINA.

CULTIVATOR AND PLANTER.

SPECIFICATION forming part of Letters Patent No. 519,044, dated May 1, 1894.

Application filed May 31, 1893. Serial No. 476,013. (No model.)

*To all whom it may concern:*

Be it known that I, JOHN E. MILLER, a citizen of the United States, residing at Linwood, in the county of Davidson and State of North Carolina, have invented certain new and useful Improvements in Corn-Planter and Cultivator Stocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a plow or cultivator stock which may be conveniently used for a corn planter, or single, double and three-plow cultivators.

The invention will first be described in connection with the drawings and then pointed out in the claim.

Figure 1 of the drawings is a plan view of the plowstock, partly broken away; Fig. 2 a detail perspective view of the corn planter with its operative mechanism; and Fig. 3 a detail view of one of the plows. Fig. 4 is a detail view of the auxiliary shank for the middle plow when it is to be set back.

In the drawings, A represents my plow-beam which is made with the integral draft-hook $a$ at the front end and, at the rear end, has two branches $a'$ $a'$ bent at $a^2$ $a^3$ at a right angle and terminating in the two parallel arms $a^4$ $a^4$, the whole being made of one piece of metal with a hole $a^5$ through which passes the bolt B which secures the front ends of the handles C C. The beam A has holes $a^7$ $a^7$ and $a^6$ $a^6$ in the branches $a'$ $a'$ and in their inner parallel arms $a^4 a^4$. Through the holes $a^7$ $a^6$ pass the long bolts D D. These bolts simply hold the shank of one plow E between the arms $a^4$ $a^4$ when only one shovel or other plow is to be used; in addition thereto, one on either side when two plows are to be used; and when three are to be used with a seeder, I have the front one in the middle and one on each side to cover the grain as shown in Fig. 2 of the drawings.

Where a triple echelon plow is wanted, I use the auxiliary shank F, one end of which is bolted to the shank of the middle plow and the other end between the arms $a^4$ $a^4$ by bolts passing through the holes $f f'$ $a^6$ $a^7$ in the bar F, the plow F' and the beam branches $a'$ $a'$.

In all the changes to which my plowstock is adapted, I use but the two fastening bolts D D which makes one stock practically subserve the purpose of five implements which is a great economy in expense and much less trouble to protect from weather as well as accident.

G represents my dropper consisting of a hopper $g$ open at bottom and provided with the slide $g'$ having the open bottomed cup $g^2$ which drops the grain into a spout that discharges the grain in the furrow behind the opening plow. I also use an agitator H which moves with the slide to prevent choking. The dropper G has an extension plate or bar which is provided with boltholes $g^4$ $g^4$ to fasten it to beam A.

H is the agitator which moves with the slide $g'$. The slide $g'$ is operated by the right hand of the plowman by means of a turn-shaft I journaled in bearings J J under the handles and having an arm K which connects by a pivoted link $k$ with the slide, also an arm K' which connects by a pivoted link $k'$ with the handlever L fulcrumed under the right handle and within easy reach of the hand which grips it.

Having thus described all that is necessary to a full understanding of my invention, what I claim as new, and desire to protect by Letters Patent, is—

A plowstock having the two rear branches $a'$ $a'$, bends $a^2$ $a^3$, parallel arms $a^4 a^4$ and bolt holes $a^5$ $a^6$ $a^7$; whereby plows may be secured upon it as and for the purposes set forth.

In testimony whereof I affix my signature in presence of two witnesses.

JOHN E. MILLER.

Witnesses:
W. F. HENDERSON,
K. H. MILLER.